US011109398B2

(12) United States Patent
Ko et al.

(10) Patent No.: US 11,109,398 B2
(45) Date of Patent: Aug. 31, 2021

(54) SIGNAL TRANSMISSION METHOD AND DEVICE USING VARIABLE RESOURCE STRUCTURE

(71) Applicant: LG Electronics Inc., Seoul (KR)

(72) Inventors: Hyunsoo Ko, Seoul (KR); Kijun Kim, Seoul (KR); Eunsun Kim, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 226 days.

(21) Appl. No.: 16/323,314

(22) PCT Filed: May 25, 2017

(86) PCT No.: PCT/KR2017/005443
§ 371 (c)(1),
(2) Date: Feb. 5, 2019

(87) PCT Pub. No.: WO2018/030614
PCT Pub. Date: Feb. 15, 2018

(65) Prior Publication Data
US 2020/0383129 A1    Dec. 3, 2020

Related U.S. Application Data

(60) Provisional application No. 62/372,816, filed on Aug. 10, 2016.

(51) Int. Cl.
*H04W 72/12* (2009.01)
*H04W 56/00* (2009.01)
(Continued)

(52) U.S. Cl.
CPC ..... *H04W 72/1263* (2013.01); *H04L 27/2607* (2013.01); *H04W 56/001* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2010/0177725 A1* 7/2010 van Rensburg ..... H04W 72/046
370/329
2012/0039285 A1* 2/2012 Seo ........................ H04L 1/0668
370/329
(Continued)

OTHER PUBLICATIONS

3GPP TSG RAN WG1 Meeting #85, R1-165242 Nanjing, China May 23-27, 2016, Agenda Item 7.1.4, Source: ITL, Title: On Frame Structure for NR (Year: 2016).*
(Continued)

*Primary Examiner* — Peter G Solinsky
*Assistant Examiner* — Sanjay K Dewan
(74) *Attorney, Agent, or Firm* — Dentons US LLP

(57) ABSTRACT

A method for transmitting a signal in a wireless communication system is disclosed. To this end, any one of first category signals comprising a synchronization signal is mapped to a symbol having any one structure of a first resource structure and a second resource structure having mutually different symbol structures, and the mapped signal is transmitted, wherein any one of a time domain location and a frequency domain location in case the first category signal is mapped to a symbol having the first resource structure coincides with any one of a time domain location and a frequency domain location in case the first category signal is mapped to a symbol having the second resource structure.

14 Claims, 12 Drawing Sheets

(51) Int. Cl.
  *H04W 72/04* (2009.01)
  *H04W 72/00* (2009.01)
  *H04L 27/26* (2006.01)
  *H04L 5/00* (2006.01)

(52) U.S. Cl.
  CPC ..... *H04W 72/005* (2013.01); *H04W 72/0453* (2013.01); *H04L 5/0007* (2013.01)

(58) Field of Classification Search
  USPC .......................................................... 370/329
  See application file for complete search history.

(56) References Cited

U.S. PATENT DOCUMENTS

| | | | | |
|---|---|---|---|---|
| 2015/0070207 | A1* | 3/2015 | Millar | G01S 13/4454 342/174 |
| 2015/0304932 | A1* | 10/2015 | Wei | H04J 11/0093 370/331 |
| 2017/0294999 | A1* | 10/2017 | Patel | H04L 1/0018 |
| 2018/0139036 | A1* | 5/2018 | Islam | H04W 56/001 |
| 2019/0132802 | A1* | 5/2019 | Kusashima | H04W 52/30 |
| 2019/0165872 | A1* | 5/2019 | Matsuda | H04L 1/16 |

OTHER PUBLICATIONS

Qualcomm Inc., Fujitsu, General Dynamics Broadband UK, Blackberry, "WF on Type 1 Discovery", 3GPP TSG RAN WG1 #74, Aug. 19-24, 2013, R1-133980.

ZTE, ZTE Microelectronics, "Frame structure design for NR", 3GPP TSG RAN WG1 Meeting #85, May 23-27, 2016, R1-164274.

ITL, "On Frame Structure for NR", 3GPP TSG RAN WG1 Meeting #85, May 23-27, 2016, R1-165242.

KT Corp., Verizon Wireless, "Discussion on NR numerology", 3GPP TSG RAN WG1 Meeting #85, May 23-27, 2016, R1-165525.

* cited by examiner (a) Narrow Subcarrier Spacing (a) Wide Subcarrier Spacing

FIG. 9
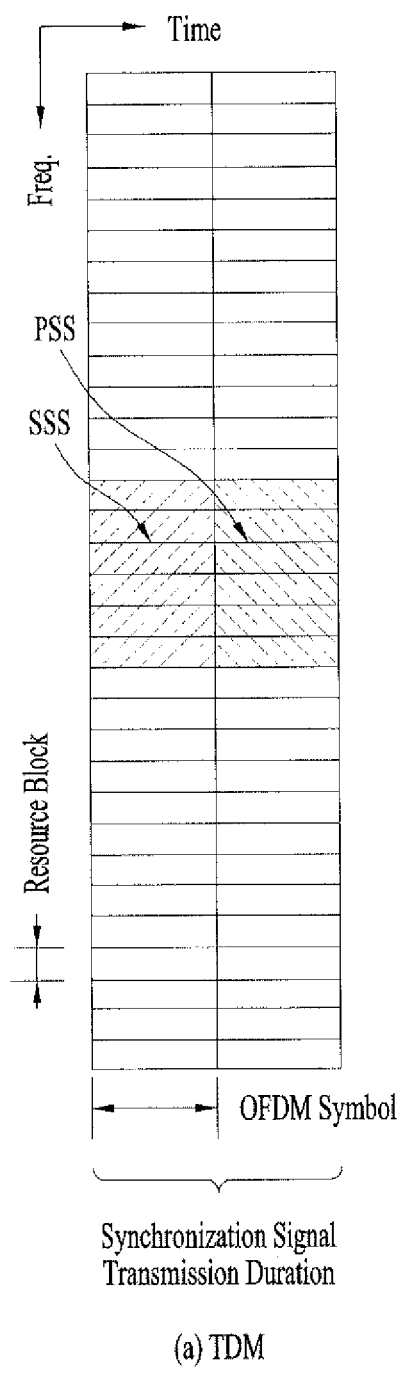
(a) TDM
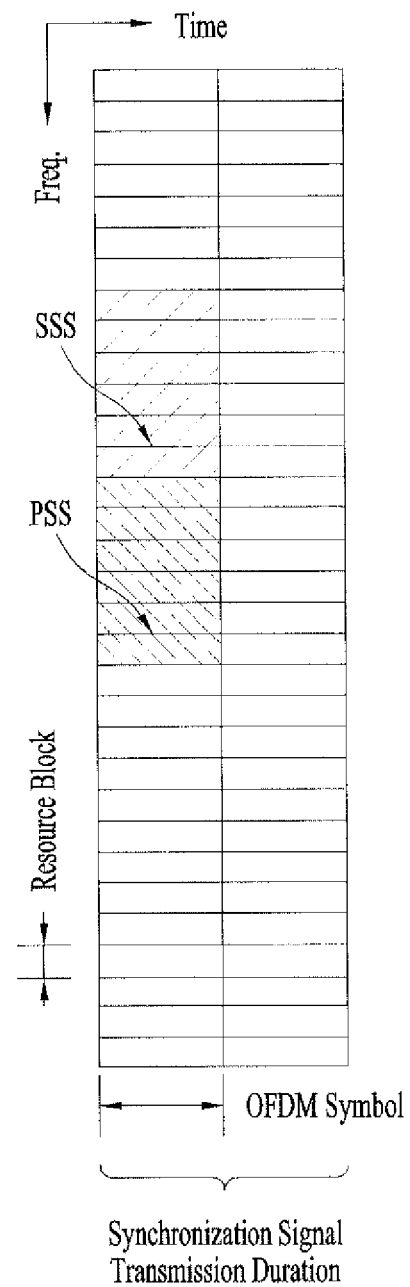
(b) FDM

FIG. 10
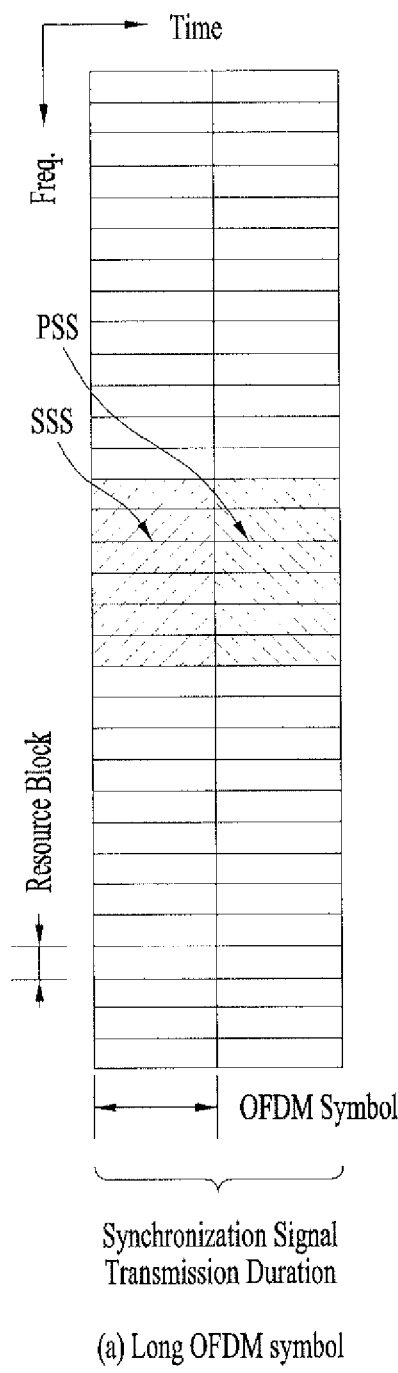
(a) Long OFDM symbol
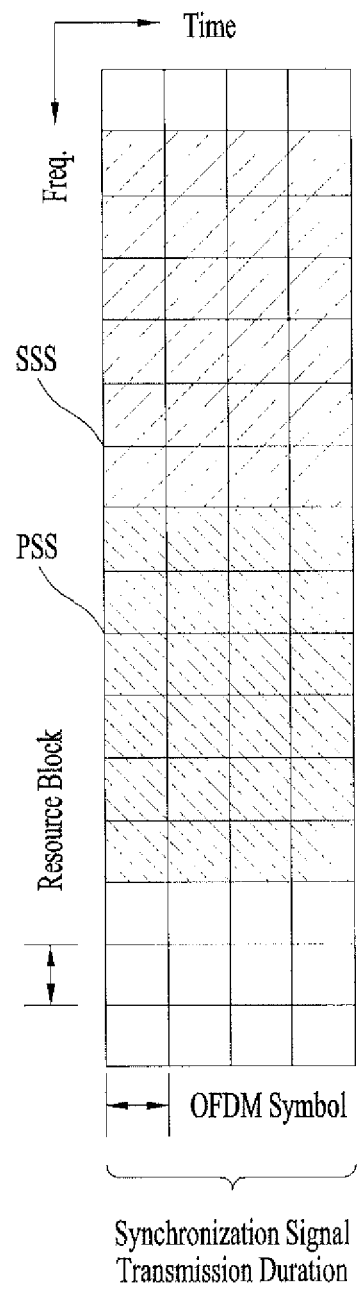
(b) Short OFDM symbol

FIG. 11
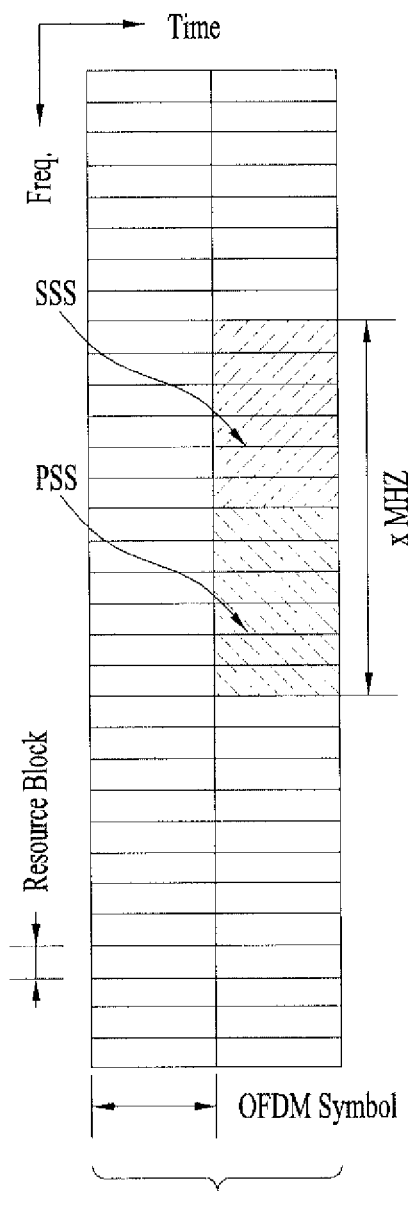
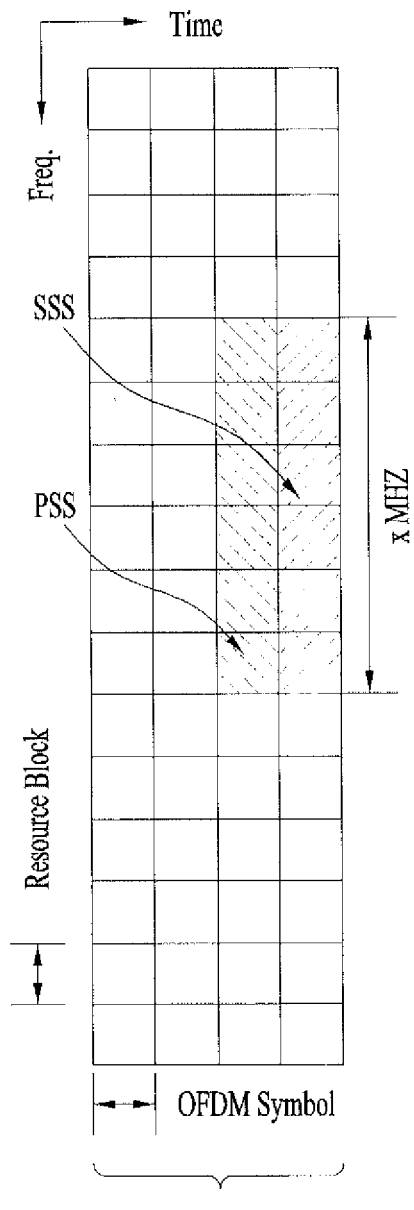
(a) Long OFDM symbol
(b) Short OFDM symbol (a) Long OFDM symbol (b) Short OFDM symbol

SIGNAL TRANSMISSION METHOD AND DEVICE USING VARIABLE RESOURCE STRUCTURE

This application is a 35 USC § 371 national stage entry of international application no. PCT/KR2017/005443 filed on May 25, 2017, and claims priority to U.S. provisional application No. 62/372,816 filed on Aug. 10, 2016, all of which are hereby incorporated by reference in their entireties as if fully set forth herein.

TECHNICAL FIELD

Following description relates to a method of transmitting and receiving a reference signal having a structure variable according to a system status in a wireless communication system and an apparatus therefor.

BACKGROUND

Recently, standardization for a mobile communication technology is arriving at the study on 5G mobile communication after passing through 4G mobile communication technologies such as LTE and LTE-A. In 3GPP, the 5G mobile communication is referred to as NR (new radio).

According to current NR system design requirements, it is able to see that there are considerably divergent requirements. For example, a frequency band used by the NR ranges from 700 MHz to 70 GHz, a system bandwidth ranges from 5 MHz to 1 GHz, moving speed has a range ranging from 0 km/h to 500 km/h, and environment for the NR includes indoor, outdoor, a large cell, and the like. In particular, the NR requires supporting in various situations.

In the various requirements existing situation, the most common design direction is to design a system in consideration of a poorest situation among the various situations. This can be identically applied to a transmission of a DMRS (demodulation reference signal) corresponding to a reference signal used for decoding data and/or control information.

In addition, various resource structures may be used for transmission of a signal such as a synchronous signal, a broadcast signal, and the like, which are used for the user equipment to initially enter the network.

DISCLOSURE

Technical Purpose

However, when a position of a time/frequency region in which a specific category signal such as a synchronous signal used for the user equipment to enter a network initially is transmitted varies, the user equipment may have increased burden to detect such a signal.

In order to solve the above-mentioned problem, following descriptions will describe a method for efficiently configuring a relationship between requirements for various resource structures and the detection burden at the user equipment.

Technical Solution

In a first aspect, there is provided a method for transmitting a signal in a wireless communication system, the method comprising: mapping one of first category signals including a synchronization signal to a symbol having one of a first resource structure and a second resource structure, wherein the first and second structures have different symbol structures; and transmitting the mapped first category signal, wherein one of a time region position and a frequency region position when the first category signal is mapped to a symbol having the first resource structure coincides with one of a time region position and a frequency region position when the first category signal is mapped to a symbol having the second resource structure.

In one embodiment of the first aspect, a OFDM symbol duration of the first resource structure is N times a OFDM symbol duration of the second resource structure, where N is an integer of 2 or greater, wherein a number of symbols having the second resource structure to which the first category signal is mapped is configured to be N times a number of symbols having the first resource structure to which the first category signal is mapped.

In one embodiment of the first aspect, a time region position at which the first category signal is transmitted is configured to be a specific time, regardless of whether the first category signal is mapped to a symbol having the first resource structure or a symbol having the second resource structure.

In one embodiment of the first aspect, the first category signal includes a Primary Synchronization Signal (PSS), a Secondary Synchronization Signal (SSS), and a Broadcast Channel (BCH).

In one embodiment of the first aspect, whether the PSS and the SSS are multiplexed using a Time Divisional Multiplexing (TDM) scheme or a Frequency Divisional Multiplexing (FDM) scheme is determined depending on whether the first category signal is mapped to a symbol having the first resource structure or to a symbol having the second resource structure.

In one embodiment of the first aspect, a subcarrier spacing of the symbol having the first resource structure has a length larger than a length of a subcarrier spacing of the symbol having the second resource structure, wherein when the first category signal is mapped to the symbol having the first resource structure and is transmitted, the PSS and the SSS are multiplexed using a TDM scheme, wherein when the first category signal is mapped to the symbol having the second resource structure and is transmitted, the PSS and the SSS are multiplexed using an FDM scheme.

In one embodiment of the first aspect, a subcarrier spacing of the symbol having the first resource structure has a length larger than a length of a subcarrier spacing of the symbol having the second resource structure, wherein when the first category signal is mapped to the symbol having the first resource structure and is transmitted, the PSS and the SSS are multiplexed using an FDM scheme, wherein when the first category signal is mapped to the symbol having the second resource structure and is transmitted, the PSS and the SSS are multiplexed using a TDM scheme.

In one embodiment of the first aspect, the first category signal includes a Primary Synchronization Signal (PSS) and a Secondary Synchronization Signal (SSS), wherein the method further comprises transmitting a second category signal including a broadcast channel (BCH) signal and a discovery signal, wherein the first category signal and the second category signal are transmitted in different time region positions.

In one embodiment of the first aspect, the first resource structure and the second resource structure are different in at least one of a subcarrier spacing, a symbol duration, and a cyclic prefix (CP) thereof.

In one embodiment of the first aspect, a length of a symbol having the first resource structure is larger than a length of a symbol having the second resource structure, wherein the signal mapped to the first resource structure is transmitted using a single beam, wherein the signal mapped to the second resource structure is transmitted using multi-beams.

In a second aspect, there is provided a device for transmitting a signal in a wireless communication system, the device comprising: a processor configured for mapping one of first category signals including a synchronization signal to a symbol having one of a first resource structure and a second resource structure, wherein the first and second structures have different symbol structures; and a transceiver for transmitting the first category signal mapped by the processor; wherein the processor is further configured for allowing one of a time region position and a frequency region position when the first category signal is mapped to a symbol having the first resource structure to coincide with one of a time region position and a frequency region position when the first category signal is mapped to a symbol having the second resource structure.

In one embodiment of the second aspect, a OFDM symbol duration of the first resource structure is N times a OFDM symbol duration of the second resource structure, where N is an integer of 2 or greater, wherein the processor is further configured for setting a number of symbols having the second resource structure to which the first category signal is mapped to be N times a number of symbols having the first resource structure to which the first category signal is mapped.

In one embodiment of the second aspect, the processor is further configured for setting a time region position at which the first category signal is transmitted to be a specific time, regardless of whether the first category signal is mapped to a symbol having the first resource structure or a symbol having the second resource structure.

In one embodiment of the second aspect, the first category signal includes a Primary Synchronization Signal (PSS), a Secondary Synchronization Signal (SSS), and a Broadcast Channel (BCH).

In one embodiment of the second aspect, the processor is further configured for determining whether the PSS and the SSS are multiplexed using a Time Divisional Multiplexing (TDM) scheme or a Frequency Divisional Multiplexing (FDM) scheme, depending on whether the first category signal is mapped to a symbol having the first resource structure or to a symbol having the second resource structure.

Technical Effect

According to the present disclosure as described above, the relationship between the demand for various resource structures and the burden of the detection by the user equipment may be efficiently configured.

The effects of the present disclosure are not limited to the above effects, and will be further described in following specific embodiments in detail.

BRIEF DESCRIPTION OF DRAWINGS

FIG. 9 and FIG. 10 illustrate a multiplexing scheme of NR PSS/SSS according to one embodiment of the present disclosure.

FIG. 11 is an illustration of another multiplexing scheme of NR PSS/SSS according to one embodiment of the present disclosure.

DETAILED DESCRIPTIONS

Hereinafter, reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

According to one aspect of the present disclosure, as described above, a method is proposed by which a specific category signal such as a synchronous signal necessary for an user equipment to perform an initial cell search is efficiently transmitted in a next generation wireless communication system using various types of resource structures. Further, a device for performing the method is provided.

Various Resource Structures According to Signal Types

Channels and signals defined in the physical layer of the mobile communication system may have a numerology including the CP lengths and subcarrier spacings which will be different depending on the situations. That is, well known channels and signals such as a shared channel, a control channel, a broadcasting channel, a synchronization signal, a channel state information reference signal, a sounding reference signal, a data demodulation reference signal, a random access channel, a multicast channel, and channels and signals newly defined for specific purposes may have different numerologies.

Figure 1:
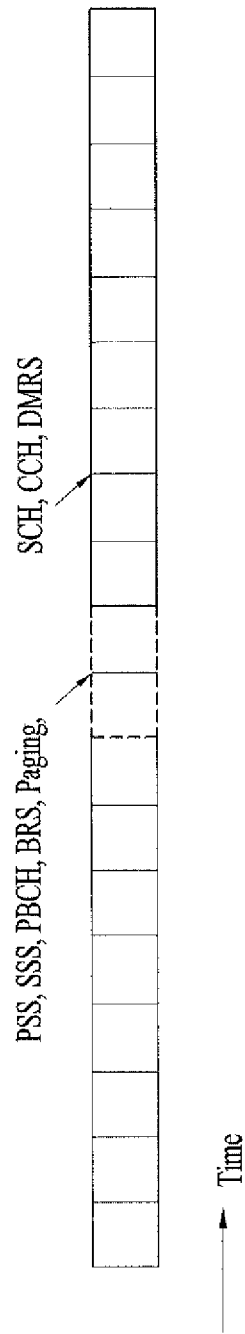
FIG. 1 to FIG. 3 illustrate situations in which various types of resource structures are used.
Figure 2:
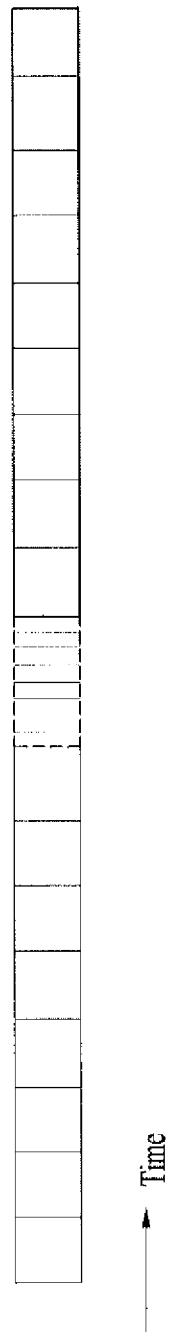
Figure 3:
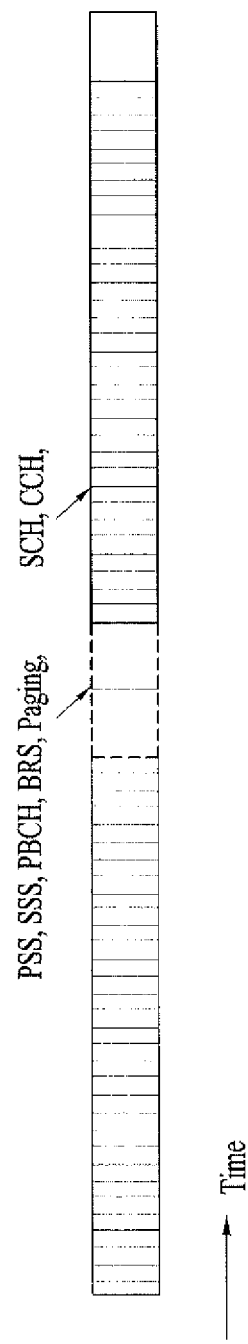

FIG. 1 to FIG. 3 illustrate situations in which various types of resource structures are used.

In a beamformed system that provides a coverage using multiple beams, a method of transmitting a signal when an appropriate beam direction between a transmission point and a receiving point is acquired may be different from a signal transmission method when the appropriate beam direction between the transmission point and the receiving point is not acquired. It may be desirable that control channel and the data channel transmissions are performed after a beam suitable for improving a signal quality between the transmission point and the receiving point has been selected. On the other hand, in the initial access, paging, random access, and scheduling request in which TRP and UE present in an arbitrary position should deliver information before a beam suitable for bi-direction is selected, it may be desirable to transmit information in each of directions in which multiple beams are directed. In this connection, the channels and signals may be designed to have different numerologies.

In the example of FIG. 1 to FIG. 3, in the above-mentioned viewpoint, PSS, SSS, PBCH, BRS, and paging signals are classified into one category, while SCH (Shared Channel), CCH (Control Channel), and DMRS are classified into another category, and, transmission thereof is performed based on this classification. Specifically, FIG. 1 shows a case of transmission of these two category signals using resources with the same structure. FIG. 2 and FIG. 3 show transmission of these two category signals using resource structures with different symbol durations. Depending on situations, signals in a category including PSS, SSS, etc. may be transmitted using a resource structure with a short symbol duration (FIG. 2) or be transmitted using a resource structure with a long symbol duration (FIG. 3).

In one embodiment of the present disclosure, the numerology set including the Subcarrier Spacings and CP lengths of the Shared Channel (SCH) used for data transmission and the Control Channel (CCH) used to transmit control information may be configured to be different from the numerology set including the Subcarrier Spacings and CP lengths of Synchronization Signal (SS) for Initial Access, Broadcasting Channel (BCH) used to transmit Essential System Information, Paging control channel (PCCH) responsible for paging, reference signal Beam selection reference signal (BRS) responsible for beam selection, etc.

Specifically, when there are various subcarrier spacings (e.g., 15, 30, 60, 75, 120, 150, 240, . . . KHz) supported by the system, channels and signals for data transmission and for control information delivery may also be able to use all possible subcarrier spacings. On the other hand, channels and signals responsible for Initial Access, Paging, and Broadcasting may be configured to use subcarrier spacings of limited values (e.g., 15, 60, 240 kHz).

For example, when a numerology such as a sub-carrier spacing of 15 kHz and CP length of 4.69 us is used for data transmission, the PSS/SSS may be configured to have the same numerology as that of the SCH and may be configured to use a wider subcarrier spacing (e.g., 60 kHz). In another example, when the PSS/SSS is transmitted using a certain numerology (e.g., subcarrier spacing 15 kHz), other channels being transmitted on component carriers containing the PSS/SSS may be configured to use various numerologies (e.g., 15, 30, 60 kHz, etc.). In another example, when the PSS/SSS is transmitted using a specific numerology (e.g., subcarrier spacing 60 kHz), other channels that are transmitted on component carriers containing the PSS/SSS may be configured to use various numerologies (e.g., 60, 120 kHz, etc.). In another example, when transmitting the PSS/SSS using 15 kHz, the BRS may be transmitted using 60 kHz.

In following descriptions, signals such as PSS/SSS as described above will be referred to as a first category signal for convenience of illustration.

A CP length applied to the channel and signal for data transmission and control information delivery may be configured independently of a CP length applied to the channel and signal for initial access, paging, and broadcasting.

Figure 4:
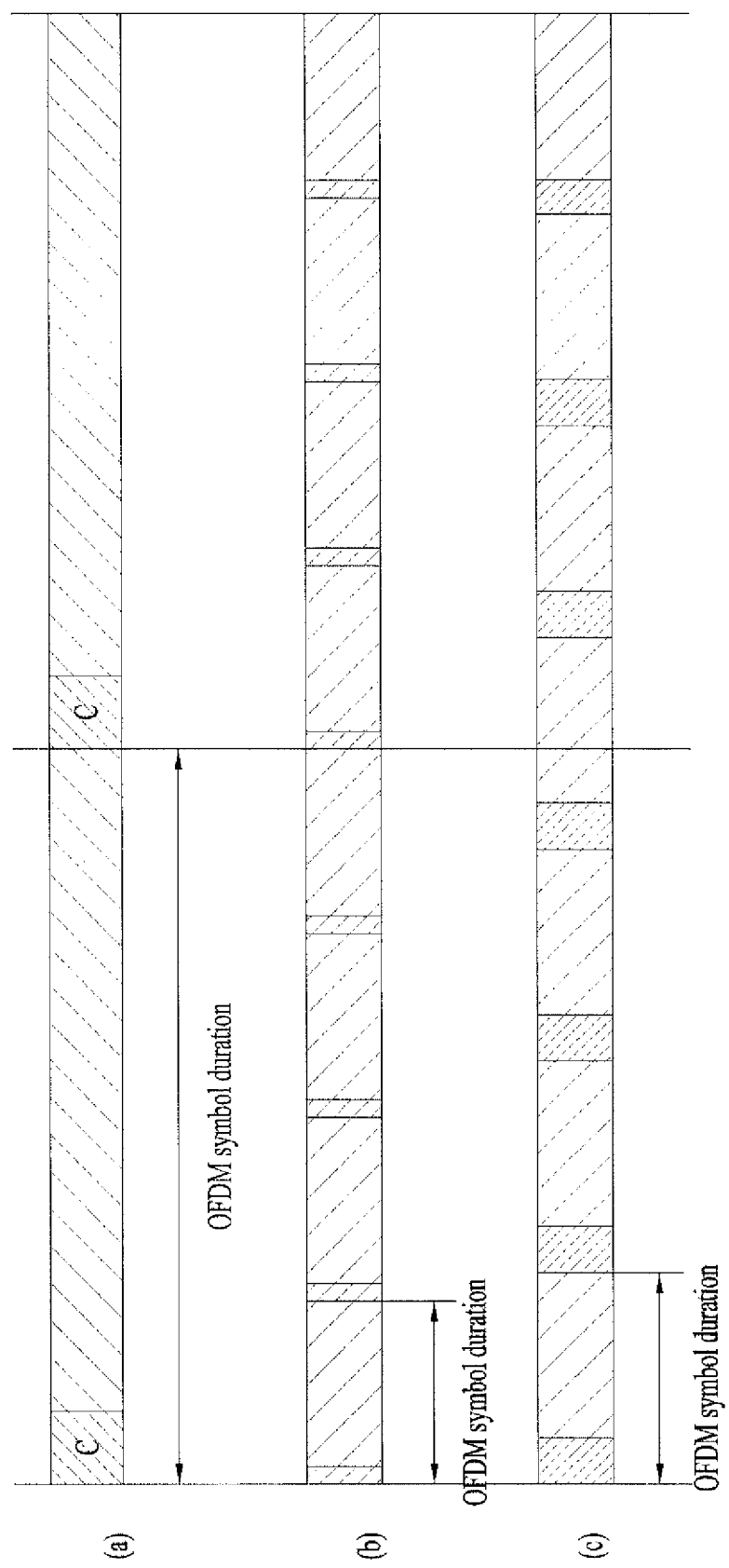
FIG. 4 shows a relationship between various symbol durations and corresponding CP lengths.

FIG. 4 shows a relationship between various symbol durations and corresponding CP lengths.

Specifically, FIG. 4 (a) shows a case with a long OFDM symbol duration and a long CP length. FIG. 4(b) and FIG. 4(c) have the same short symbol duration but different CP lengths.

When configuring the PSS/SSS to use a wider subcarrier spacing, and when keeping the CP overhead to be an existing level (e.g., 4.69 us/66.667 us=7%), the CP length thereof becomes shorter by 1/N (for example, N=4, 15 kHz×N=60 kHz, 4.69 us×1/N=1.172 us). In this connection, in situations where the delay spread is long, for example, when the cell radius is long or multi-TRP transmission occurs, there is a possibility inter-symbol interference may be caused. In an approach to solve this problem, when configuring the PSS/SSS (or Paging, Broadcasting channel, Beam selection signal, etc.) belonging to the first category to use a shorter symbol duration than that of the SCH, the CP length thereof may be adapted to match the CP length of the SCH. For example, the PSS/SSS transmission time in the legacy LTE system is (4.69 us+66.667 us)×2=142.714 us. Assuming that PSS/SSS with a wide subcarrier spacing is transmitted in this duration, 8 OFDM symbols with a length of 17.839 (=1.1725 us+16.667 us) may be used. In this case, the CP length may be shortened (4.69 us→1.1725 us), which may make it difficult to deal with the delay spread of the legacy coverage. When applying an approach in which the CP length increases and the number of symbols decreases, the CP length may be designed to be 3.8 us and the number of OFDM symbols may be configured to be 7 (142.8 us=7× 20.4 us=7×(3.8 us+16.667 us)).

As shown in FIG. 4(a) and FIG. 4(b), when the OFDM symbol length changes according to the subcarrier spacing, the CP length may be proportional to the symbol length. As shown in FIG. 4(c), increasing the CP overhead may allow the OFDM symbol to be robust against ISI. For example, the SCH may be transmitted as shown in FIG. 4(a), while the SS/BCH/BRS may be transmitted as shown in FIG. 4(a) or FIG. 4(c).

In one embodiment of the present disclosure, a time duration over which a common signal/channel is transmitted may be defined and, thus, beam sweeping may be performed for the number of OFDM symbols included in the corresponding time duration. Alternatively, a single beam transmission or a multi-beam transmission may be defined according to the OFDM symbol length included in the corresponding time duration.

The time duration in FIG. 4 is defined as Common Signal/Channel transmission duration. When two OFDM symbols are transmitted in a duration as shown in FIG. 4(a), it is assumed that a beam change occurs in each OFDM symbol and two beams are used. When 8 OFDM symbols are transmitted in a duration as shown in FIG. 4(b), it is assumed that different beams are transmitted in 8 OFDM symbols.

That is, the time duration of FIG. 4 is defined as the transmission duration of the common signal/channel. When a long length OFDM symbol is transmitted as shown in FIG. 4(a), single-beam transmission is assumed. When a short OFDM symbol is transmitted as shown in FIG. 4(b), multi-beam transmission is assumed.

Transmission Scheme of First Category Signal

When the first category signals for Initial Access are configured in a system having various numerologies as described above, an approach to designing the signals using a scheme in which the numerologies of the first category signals are as common as possible to each other may be considered.

Figure 5:
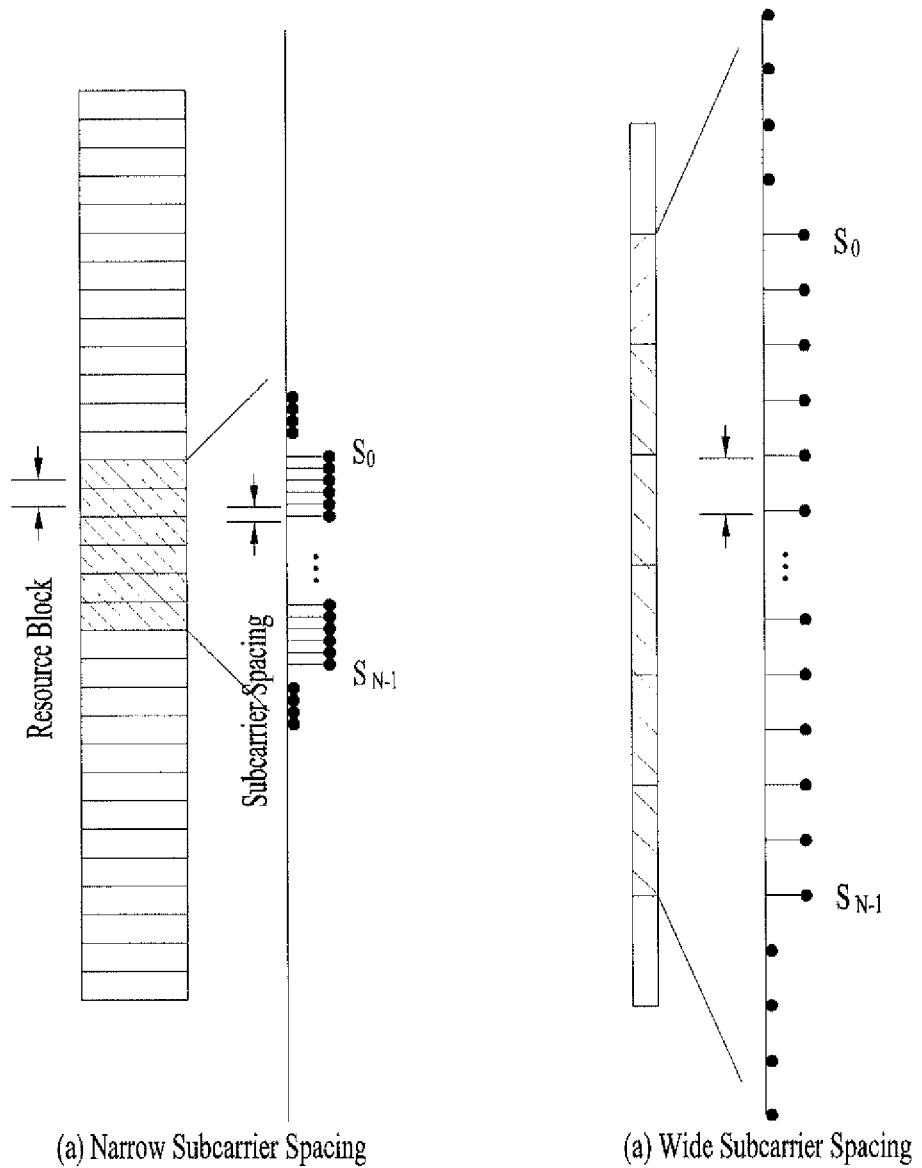
FIG. 5 is a diagram illustrating transmission of first category signals using the same scheme regardless of a difference between resource structures thereof.

FIG. 5 is a diagram illustrating a case where the first category signals are transmitted using the same scheme regardless of the difference between the resource structures thereof.

For example, when designing a synchronization signal, and when N subcarriers are used to map sequences thereto, the N subcarriers may be used regardless of subcarrier spacing lengths.

As shown in FIG. 5, when N sequences are used and the SS is configured such that the N sequences are mapped to M subcarriers (M>N), the M subcarriers may be commonly used for a symbol with a narrow subcarrier spacing and for a symbol with a wide subcarrier spacing.

For example, when 72 subcarriers are used, and a subcarrier spacing is 15 kHz, a bandwidth of 1.08 MHz (=72×15 kHz) is used. When the subcarrier spacing is 60 kHz, a bandwidth of 4.32 MHz (=72×60 kHz) is used.

However, when the first category signals are transmitted in this manner, the burden of detection by the user equipment may be a problem.

Figure 6:
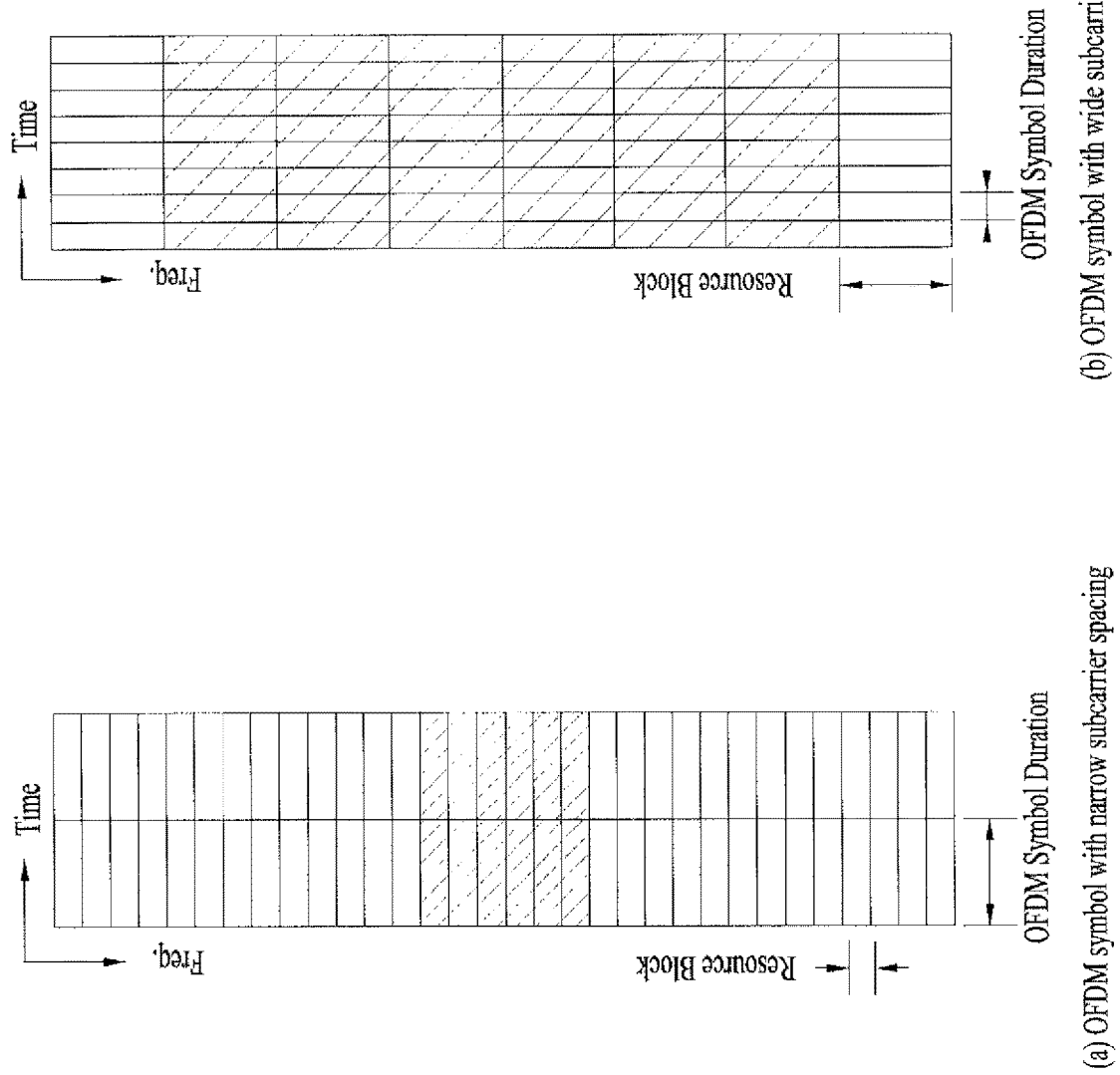
FIG. 6 is a diagram illustrating a scheme for matching time/frequency region positions of the first category signals according to one embodiment of the present disclosure.

FIG. 6 is a diagram illustrating a scheme for matching time/frequency region positions for transmission of the first category signals according to one embodiment of the present disclosure.

Specifically, FIG. 6 shows an example of matching the time region positions of the first category signals. In this example, the duration of a OFDM symbols with a narrow subcarrier spacing is larger while the duration of a OFDM symbol with a wide subcarrier spacing is smaller. It is suggested that the total time durations used for synchronization may substantially match each other between transmissions of the first category signals regardless of the subcarrier spacings thereof.

For example, the total time durations may substantially match each other between transmissions of the first category signals by configuring as follows: when a subcarrier spacing is 15 kHz as shown in FIG. 6(a), two OFDM symbols are used, while when the subcarrier spacing is 60 kHz as shown in FIG. 6(b), eight OFDM symbols are used.

When the system bandwidth is wide and thus a band used for sending the signal is sufficient, generating multiple OFDM symbols using a wide subcarrier spacing and having a narrow time spacing may provide time resources for multi-beam transmission. On the other hand, in case of a narrow system bandwidth, a resource may be allocated on a frequency basis while using a narrow subcarrier spacing.

In addition, as described above, matching the time region positions regardless of which resource structure is used may reduce the burden of the detection by the user equipment.

In a specific embodiment of the present disclosure, the first category signals/channels used for initial access may be divided into signals using a narrow subcarrier spacing and signals using a wide subcarrier spacing. For example, the PSS/SSS/ESSS may be transmitted using a long OFDM with a wide subcarrier spacing, while the BRS may be transmitted in a short OFDM symbol with a wide subcarrier spacing.

In one example, when a synchronization signal or beam measurement reference signal is transmitted using multi-beams in a Massive MIMO system, the synchronization signal or beam measurement reference signal transmission duration may be limited to a certain rang regardless of the numerology thereof. In other words, a limited number of multi-beams may be used for a long OFDM symbol-based synchronization signal or beam measurement reference signal transmission, as compared to a short OFDM symbol-based signal transmission.

Figure 7:
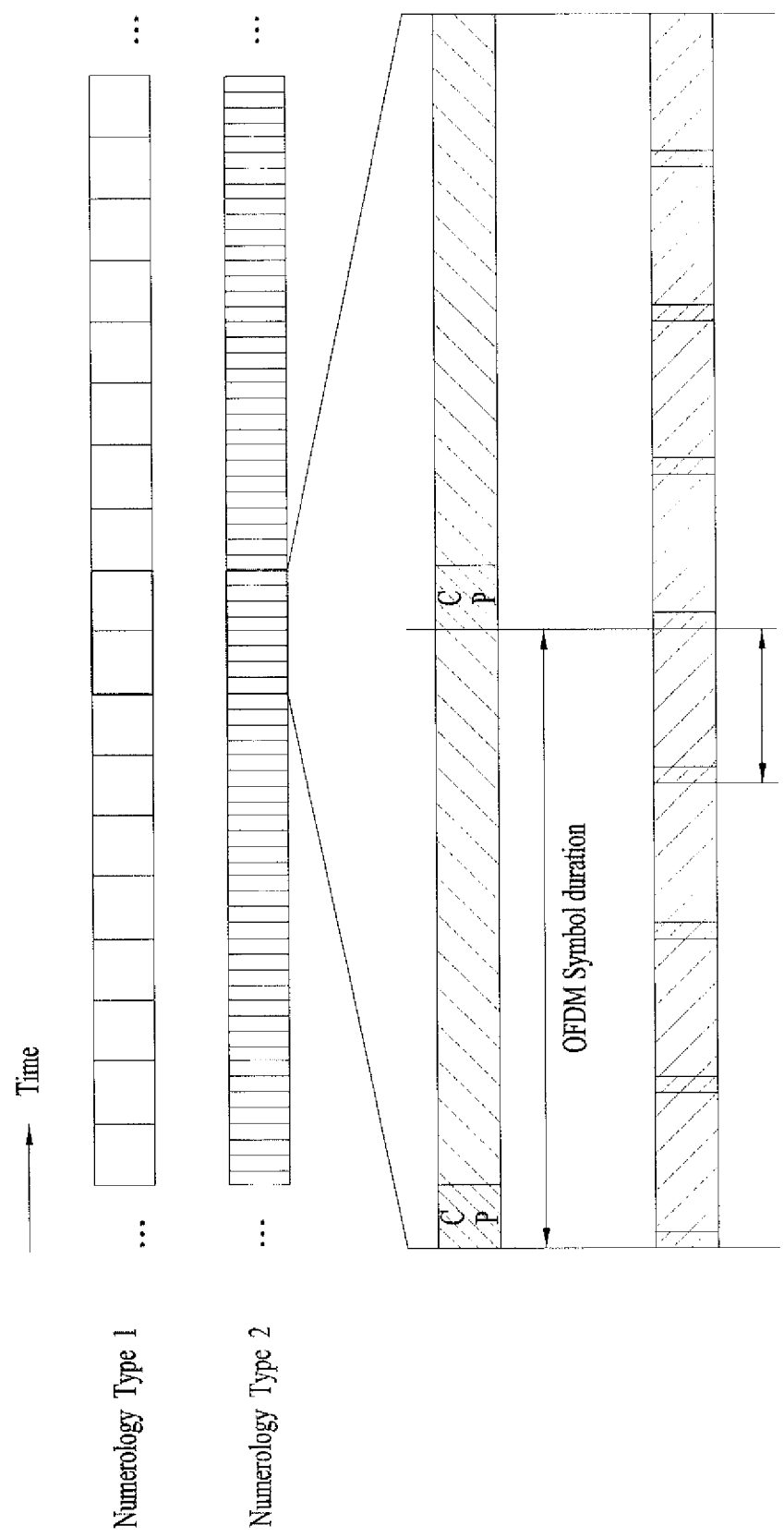
FIG. 7 illustrates a time position of a synchronization symbol according to one embodiment of the present disclosure.

FIG. 7 illustrates a time position of the Synchronization Symbol according to one embodiment of the present disclosure.

For example, the time position of the synchronization signal in Numerology type 1 having a long OFDM symbol duration and the time position of the synchronization signal in Numerology type 2 having a short OFDM symbol duration may match each other as shown in FIG. 7.

Figure 8:
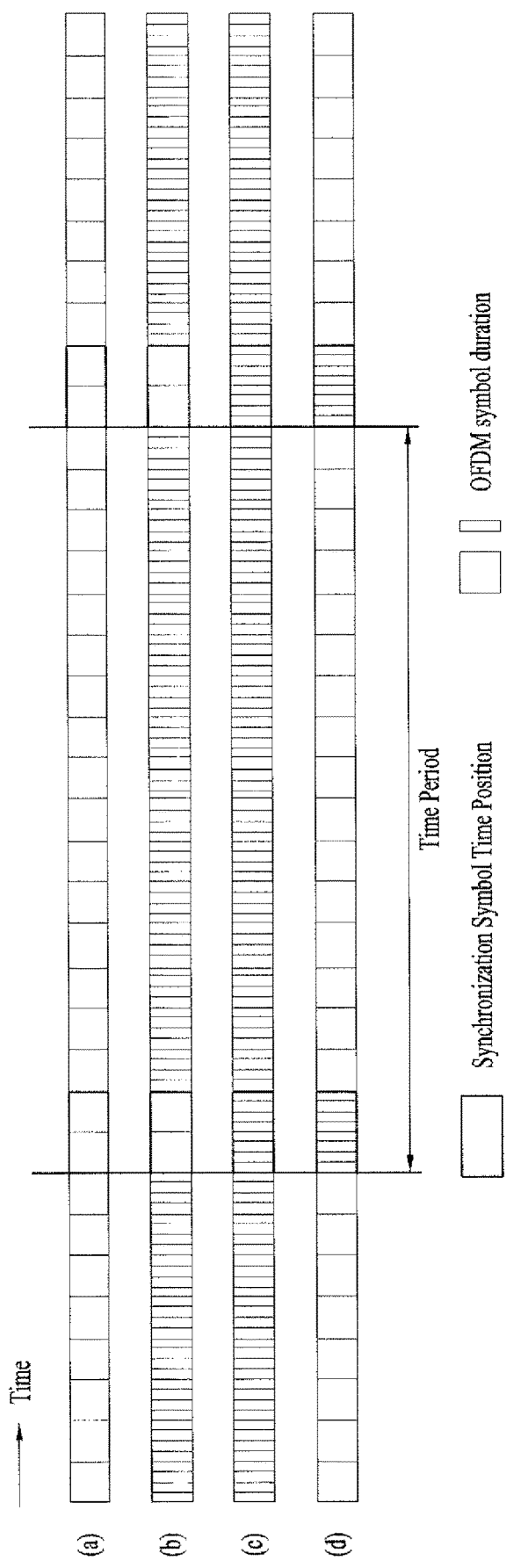
FIG. 8 is a diagram illustrating a time position of a synchronization symbol according to another embodiment of the present disclosure.

FIG. 8 illustrates a time position of the Synchronization Symbol according to another embodiment of the present disclosure.

Specifically, in this example, the transmission periods of the synchronization signals may be configured to be the same irrespective of different durations of OFDM symbols as shown in FIG. 8.

FIG. 8 shows an example of the transmission time period of the synchronization signal. FIG. 8(a) to FIG. 8(d) are examples in which the OFDM symbol duration for the synchronization signal transmission is the same as or different from the OFDM symbol duration for other channels. Synchronization signals are transmitted at the same transmission period (e.g., 5 ms) in the presence of signal and channels with various numerologies in the component carrier.

Multiplexing of PSS/SSS

The synchronization signal of the NR system may include the Primary Synchronization Signal (PSS) and the Secondary Synchronization Signal (SSS). Both the signals may be multiplexed using a TDM or FDM scheme. Hereinafter, the multiplexing scheme of the PSS/SSS among the first category signals will be described.

FIG. 9 and FIG. 10 illustrate the multiplexing scheme of NR PSS/SSS according to one embodiment of the present disclosure.

As shown in FIG. 9, there are TDM schemes as shown in FIG. 9(a) and FDM schemes as shown in FIG. 9(b) as the PSS/SSS multiplexing scheme. In this situation, one implementation of the present disclosure suggests that the multiplexing scheme of PSS/SSS varies between the TDM and FDM based on the Numerology.

For example, as shown in FIG. 10, a PSS/SSS with a long OFDM symbol duration (e.g., based on a 15-kHz subcarrier spacing) may employ the TDM, while a PSS/SSS with a short OFDM symbol duration (e.g., based on 30 kHz subcarrier spacing) may employ the FDM. It is assumed that the TDMed PSS/SSSs have the same beam direction. It is assumed that the FDMed PSS/SSSs have different beam directions on a symbol basis.

In a situation where PSS/SSSs are transmitted in different frequency bands, the multiplexing scheme may be applied differently according to the minimum bandwidths of the channels. For example, the PSS/SSS may be TDMed when there is a limit of the system bandwidth such as below 6 GHz band, while the PSS/SSS may be FDMed where the system bandwidth is wide such as 6 GHz or greater. Further, in the single-beam based transmission band, the PSS/SSS may be TDMed while in the multi-beam based transmission band, the PSS/SSS may be FDMed.

For the multi-beam based synchronization signal transmission, it is desirable to transmit the synchronization signal according to the direction of each beam to obtain the beamforming gain. When there are N beams, N times of a unit time taken to transmit the PSS/SSS may be required (for example, one OFDM symbol or two OFDM symbols may be the unit time according to the multiplexing method as shown in FIG. 9). In this connection, a special signal indicating the OFDM symbol position of the repeatedly transmitted PSS/SSS may be multiplexed with the PSS/SSS and may be transmitted on a OFDM symbol basis. For convenience of illustration, this special signal is called an Extended Synchronization Signal (ESS). Depending on the design of the synchronization signal, the ESS function may be included in other signals. A state to be represented may be determined depending on the number of OFDM symbols used for transmission. The state may be equal to an amount of information to be detected from the ESS.

On the other hand, an opposite configuration to that of the above-described embodiment may be applied.

FIG. 11 is an illustration of another multiplexing scheme of NR PSS/SSS according to one embodiment of the present disclosure.

Specifically, in this embodiment, as shown in FIG. 11, a PSS/SSS with a long OFDM symbol duration (e.g., based on a 15-kHz subcarrier spacing) may be FDMed, while, a PSS/SSS with a short OFDM symbol duration (e.g., based on a 30 kHz subcarrier spacing) may be TDMed.

For example, when multiplexing the PSS/SSS with considering a minimum system bandwidth, and when intending to transmit the synchronization signals with different numerologies in a system supporting various numerologies, followings may be considered: in the OFDM symbol with a narrow subcarrier spacing, the FDM may be applied to the PSS/SSS, while, in the OFDM symbol with a wide subcarrier spacing, the TDM may be applied to the PSS/SSS due to a bandwidth limit. This approach may be considered when intending to choose a numerology that meets the policy of the system on the same carrier or on similar carriers with the minimum system bandwidth.

The size (15 kHz, 30 kHz) of the subcarrier spacing as mentioned in the above-mentioned example is merely an example. Thus, the subcarrier spacing having other sizes may be applicable. In the above example, the multiplexing of the PSS/SSS was taken as an example. The present disclosure is not limited thereto. The same approach may be equally applied to multiplexing of other signals used for the initial synchronization process, for example, an Extended Synchronization Signal, a PBCH, and a Beam Measurement Reference Signal.

In an embodiment of the present disclosure, the numbers of OFDM symbols used in the time region to transmit the synchronization signals may be differently configured depending on the OFDM symbol durations.

Figure 12:
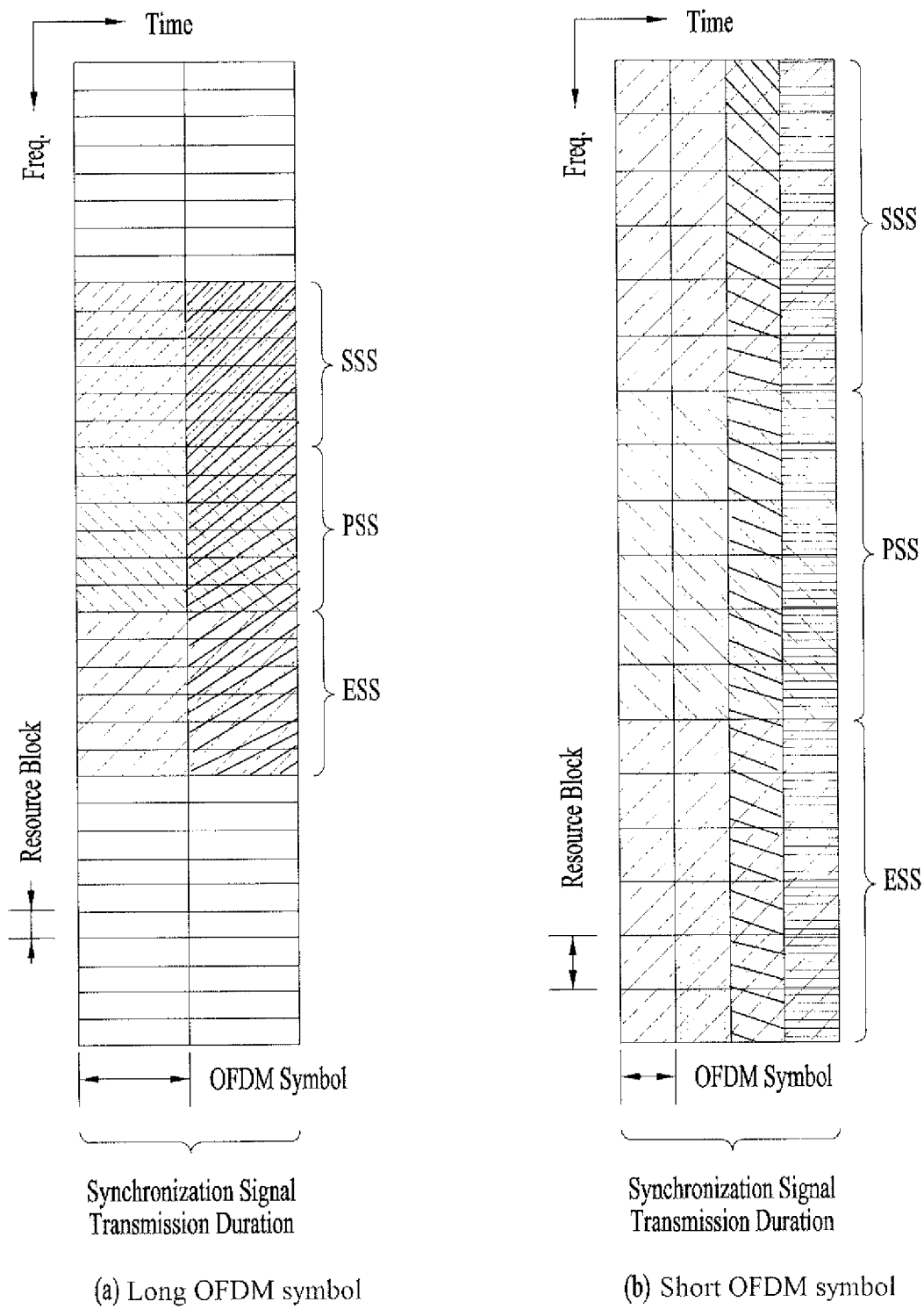
FIG. 12 shows a method for transmitting a synchronous signal according to one embodiment of the present disclosure.

FIG. 12 shows a method for transmitting a synchronization signal according to one embodiment of the present disclosure.

As shown in FIG. 12, when the numbers of OFDM symbols used in the time region to transmit the synchronization signals are differently configured depending on the OFDM symbol durations, the number of information (e.g., OFDM symbol position information detected using the ESS) to be detected using the synchronization signal may also vary.

Figure 13:
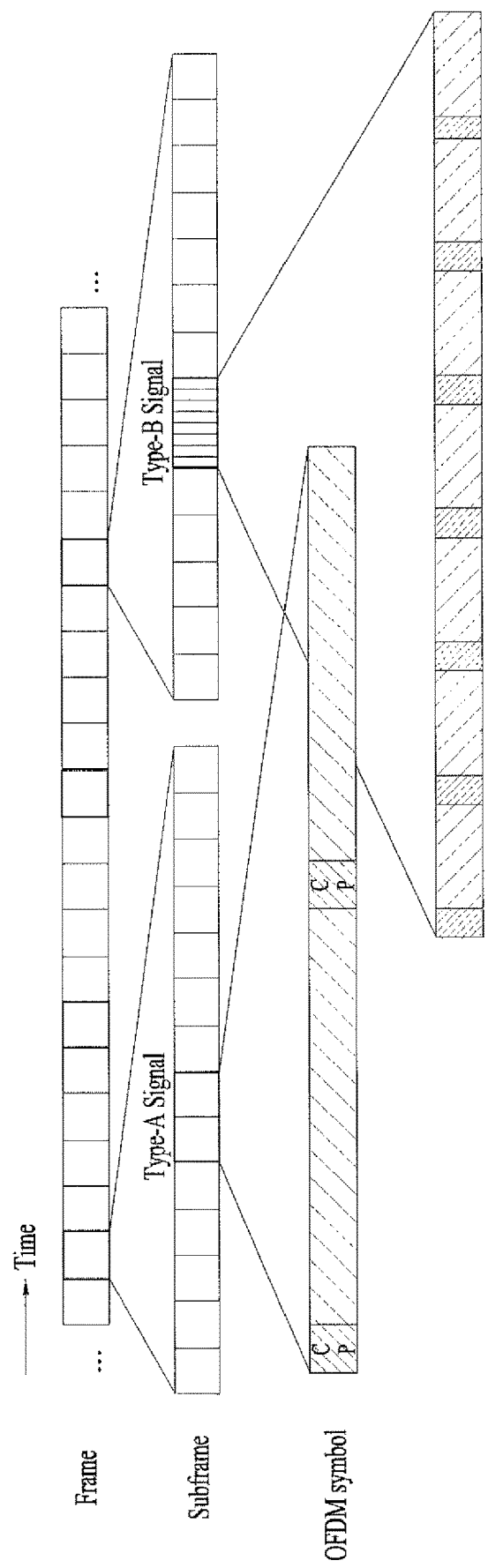
FIG. 13 shows an example of constructing a multi-beam based synchronization signal with OFDM symbols of different lengths according to one embodiment of the present disclosure.

FIG. 13 shows an example of configuring a multi-beam based synchronization signal with OFDM symbols of different lengths according to one embodiment of the present disclosure.

Different types of common signals and common channels may be transmitted at different times. For example, there may be a Type-A signal (or a first category signal) such as PSS/SSS and a Type-B signal (or a second category signal) such as a PBCH/Discovery RS. In this case, the Type-A signal and Type-B signal may be transmitted in different subframes or in different OFDM symbols in the same subframe, as shown in FIG. 13.

In another example, the signals may be divided into Type-A and Type-B signals as described above based on Numerologies. There may be the Type-A signal having a wide OFDM symbol and the Type-B signal having a short OFDM symbol. In this case, the Type-A signal and Type-B signal may be transmitted in different subframes or in different OFDM symbols in the same subframe.

Moreover, the Type-A and Type-B signals may be multiplexed in some OFDM symbols in channels having different attributes. In this embodiment, a discovery reference signal, a CSI-RS, or a measurement RS may be configured using short OFDM symbols. Different beams may be applied between the short OFDM symbols.

Figure 14:
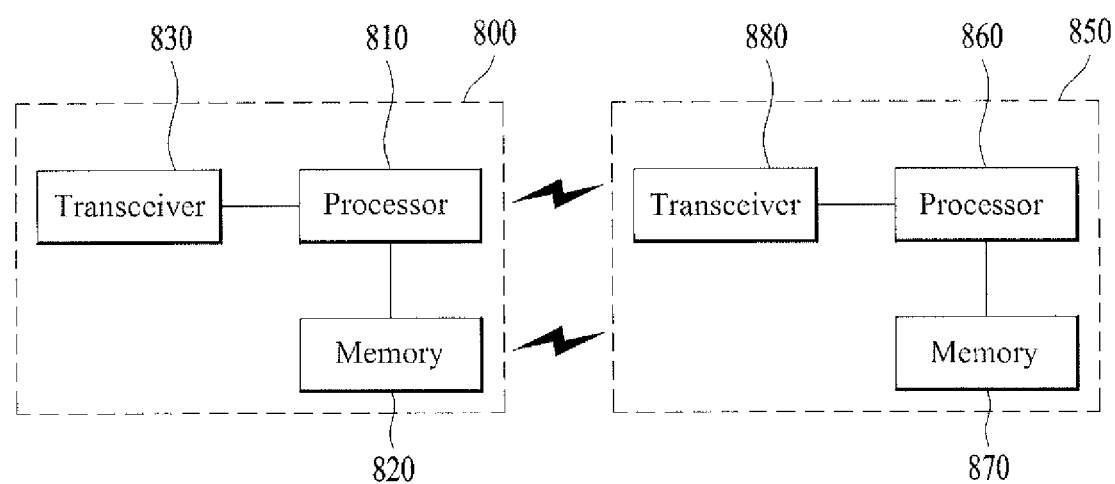
FIG. 14 is a diagram for illustrating a device for performing the above-described operation.

FIG. 14 is a diagram for explaining a device for performing abovementioned operations.

In FIG. 14, a wireless device 800 corresponds to a specific UE in the foregoing description and a wireless device 850 may correspond to a base station or an eNB.

The UE can include a processor 810, a memory 820, and a transceiver 830 and the eNB 850 can include a processor 860, a memory 870, and a transceiver 880. The transceiver 830/880 transmits/receives a radio signal and can be executed in a physical layer. The processor 810/860 is executed in a physical layer and/or a MAC layer and is connected with the transceiver 830/880. The processor 810/860 can perform a procedure of transmitting the aforementioned SS block.

The processor 810/860 and/or the transceiver 830/880 can include an application-specific integrated circuit (ASIC), a different chipset, a logical circuit, and/or a data processor. The memory 820/870 can include a ROM (read-only memory), a RAM (random access memory), a flash memory, a memory card, a storing media and/or a different storing unit. When one embodiment is executed by software, the aforementioned method can be executed by a module (e.g., process, function) performing the aforementioned function. The module can be stored in the memory 820/870 and can be executed by the processor 810/860. The memory 820/870 can be deployed to the inside or outside of the processor 810/860 an can be connected with the processor 810/860 by a well-known medium.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention.

INDUSTRIAL APPLICABILITY

The present invention can be applied not only to the NR system but also to a different wireless system in which various requirements exist.

The invention claimed is:

1. A method for transmitting a signal in a wireless communication system, the method comprising:
mapping a first signal to resources having one of a first resource structure and a second resource structure, wherein the first resource structure and the second resource structure are different in at least one of a subcarrier spacing, a symbol duration, and a cyclic prefix (CP) thereof; and
transmitting the mapped first signal,
wherein one of a time region position and a frequency region position based on the first signal being mapped to resources having the first resource structure coincides with one of a time region position and a frequency region position based on the first signal being mapped to a resources having the second resource structure.

2. The method of claim 1,
wherein an Orthogonal Frequency Division Multiplexing (OFDM) symbol duration of the first resource structure is N times an OFDM symbol duration of the second resource structure, where N is an integer of 2 or greater, and
wherein a number of symbols having the second resource structure to which the first signal is mapped is configured to be N times a number of symbols having the first resource structure to which the first signal is mapped.

3. The method of claim 1, wherein a time region position at which the first signal is transmitted is configured to be a specific time, regardless of whether the first signal is mapped to a symbol having the first resource structure or a symbol having the second resource structure.

4. The method of claim 1, wherein the first signal includes a Primary Synchronization Signal (PSS), a Secondary Synchronization Signal (SSS), and a Broadcast Channel (BCH).

5. The method of claim 4, wherein whether the PSS and the SSS are multiplexed using a Time Divisional Multiplexing (TDM) scheme or a Frequency Divisional Multiplexing (FDM) scheme is determined depending on whether the first signal is mapped to a symbol having the first resource structure or to a symbol having the second resource structure.

6. The method of claim 5,
wherein a subcarrier spacing of a symbol having the first resource structure has a length larger than a length of a subcarrier spacing of a symbol having the second resource structure,
wherein based on the first signal being mapped to the symbol having the first resource structure and being transmitted, the PSS and the SSS are multiplexed using a TDM scheme, and
wherein based on the first signal being mapped to the symbol having the second resource structure and being transmitted, the PSS and the SSS are multiplexed using an FDM scheme.

7. The method of claim 5,
wherein a subcarrier spacing of a symbol having the first resource structure has a length larger than a length of a subcarrier spacing of a symbol having the second resource structure,
wherein based on the first signal being mapped to the symbol having the first resource structure and being transmitted, the PSS and the SSS are multiplexed using an FDM scheme, and
wherein based on the first signal being mapped to the symbol having the second resource structure and being transmitted, the PSS and the SSS are multiplexed using a TDM scheme.

8. The method of claim 1,
wherein the first signal includes a Primary Synchronization Signal (PSS) and a Secondary Synchronization Signal (SSS),
wherein the method further comprises transmitting a second signal including a broadcast channel (BCH) signal and a discovery signal, and
wherein the first signal and the second signal are transmitted in different time region positions.

9. The method of claim 1,
wherein a length of a symbol having a first resource structure is larger than a length of a symbol having a second resource structure,
wherein, based on the first signal being mapped to a symbol having the first resource structure, the first signal is transmitted using a single beam,
wherein, based on the first signal being mapped to a symbol having the second resource structure, the first signal is transmitted using multiple beams.

10. A device for transmitting a signal in a wireless communication system, the device comprising:
a processor configured for mapping a first signal to resources having one of a first resource structure and a second resource structure, wherein the first resource structure and the second resource structure are different in at least one of a subcarrier spacing, a symbol duration, and a cyclic prefix (CP) thereof; and
a transceiver for transmitting the first signal mapped by the processor;
wherein the processor is further configured for allowing one of a time region position and a frequency region position based on the first signal being mapped to resources having the first resource structure to coincide with one of a time region position and a frequency region position based on the first signal being mapped to resources having the second resource structure.

11. The device of claim 10,
wherein an Orthogonal Frequency Division Multiplexing (OFDM) symbol duration of the first resource structure is N times an OFDM symbol duration of the second resource structure, where N is an integer of 2 or greater, and
wherein the processor is further configured for setting a number of symbols having the second resource structure to which the first signal is mapped to be N times a number of symbols having the first resource structure to which the first signal is mapped.

12. The device of claim 10, wherein the processor is further configured for setting a time region position at which the first signal is transmitted to be a specific time, regardless of whether the first signal is mapped to a symbol having the first resource structure or a symbol having the second resource structure.

13. The device of claim 10, wherein the first signal includes a Primary Synchronization Signal (PSS), a Secondary Synchronization Signal (SSS), and a Broadcast Channel (BCH).

14. The device of claim 13, wherein the processor is further configured for determining whether the PSS and the SSS are multiplexed using a Time Divisional Multiplexing (TDM) scheme or a Frequency Divisional Multiplexing (FDM) scheme, depending on whether the first signal is mapped to a symbol having the first resource structure or to a symbol having the second resource structure.

* * * * *